United States Patent Office 3,647,744
Patented Mar. 7, 1972

3,647,744
FRICTION MATERIAL ADDITIVES FOR
IMPROVED PERFORMANCE
James L. Rich, Allen Park, and Marvin H. Weintraub,
Oak Park, Mich., assignors to Ford Motor Company,
Dearborn, Mich.
Filed Jan. 22, 1970, Ser. No. 5,060
Int. Cl. C08k 1/18
U.S. Cl. 260—38                                  2 Claims

ABSTRACT OF THE DISCLOSURE

This invention teaches that conventional automotive brake linings which are basically compounded from asbestos and a synthetic thermosetting resin can be greatly improved by the addition of a small amount of any of the alkali metal fluorides and especially by the addition of sodium fluoride.

BACKGROUND OF INVENTION

The function of automotive brake linings is to convert the kinetic energy inherent in a moving vehicle to heat and to absorb this heat and transfer it, eventually, to the ambient. It is usually desirable that the coefficient of friction between the brake lining and the metal drum be as high as possible, be independent of inevitable variations in operating conditions such as temperature and moisture, and that the necessary energy conversion be accomplished with a minimum of wear of the lining and the drum.

The conventional brake lining employed in the automotive industry is based upon asbestos and a thermo-setting resin modified by sundry additives to enhance specific properties. Typical brake lining compositions are described in detail in United States Letters Patent 3,227,249, dated Jan. 4, 1966. This patent is interesting in that it describes as a particular additive to brake lining compositions, the compound cryolite. Cryolite is defined as a double fluoride of sodium and aluminum and having the formula $Na_3AlF_6$.

This invention is predicated upon our discovery that the fluorides of the alkali metals are superior to cryolite as a brake lining additive and less costly to use. Particularly attractive results have been obtained with sodium fluoride, although lithium and potassium fluoride are beneficial.

THE INVENTION

To illustrate this invention a standard production brake lining composition was modified by the addition of varying amounts of lithium fluoride, sodium fluoride and potassium fluoride. Lithium fluoride was added in the amounts of 6%, 12% and 18%. The preferred additive, sodium fluoride, was added in the amounts of 6%, 12% and 20%. Potassium fluoride was added in the same amounts as the sodium fluoride.

Figure 1:
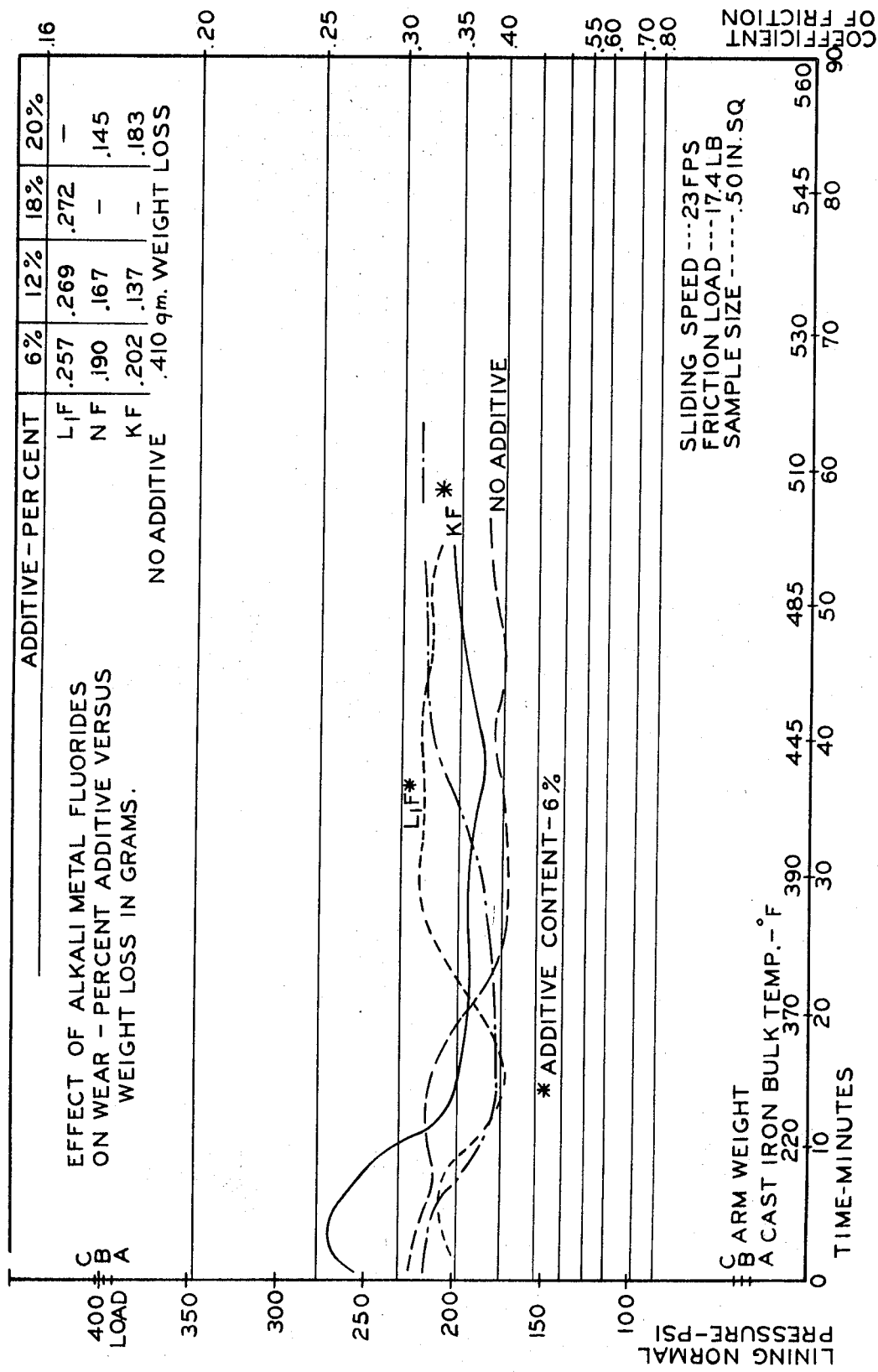

The results obtained with the brake linings, so compounded, as compared to each other and to the unaltered lining composition, is best understood from a study of FIG. 1. FIG. 1 represents results obtained from a brake lining testing machine described in a Society of Automotive Engineers publication 670,079 published Jan. 9–13, 1967 and entitled A New Laboratory Friction and Wear Test for the Characterization of Brake Linings. The authors are Anderson, Gratch and Hayes. The outstanding characteristic of this machine is that it employs a constant rubbing velocity and with this constant rubbing velocity absorbs energy at a fixed rate by varying the pressure between the brake lining under test and the member upon which the brake lining rubs.

The graph depicted in FIG. 1 has time and temperature, as the abscissae and lining pressure for constant energy dissipation as the ordinate. Obviously, the smaller the value of the pressures recorded on the ordinate scale, the more satisfactory the lining under test, other factors being equal. Attention is invited to the fact that the four 888 curves of FIG. 1 represent unaltered lining, lining plus 6% sodium fluoride, lining plus 6% potassium fluoride and lining plus 6% lithium fluoride. These four curves show, at best, only minor effects of these additives to brake lining, insofar as friction qualities and fade is concerned. However, attention is invited to the tabulation in the upper right-hand corner of FIG. 1 demonstrating a dramatic reduction in the wear suffered by the altered brake linings and especially the lining containing sodium fluoride.

Figure 2:
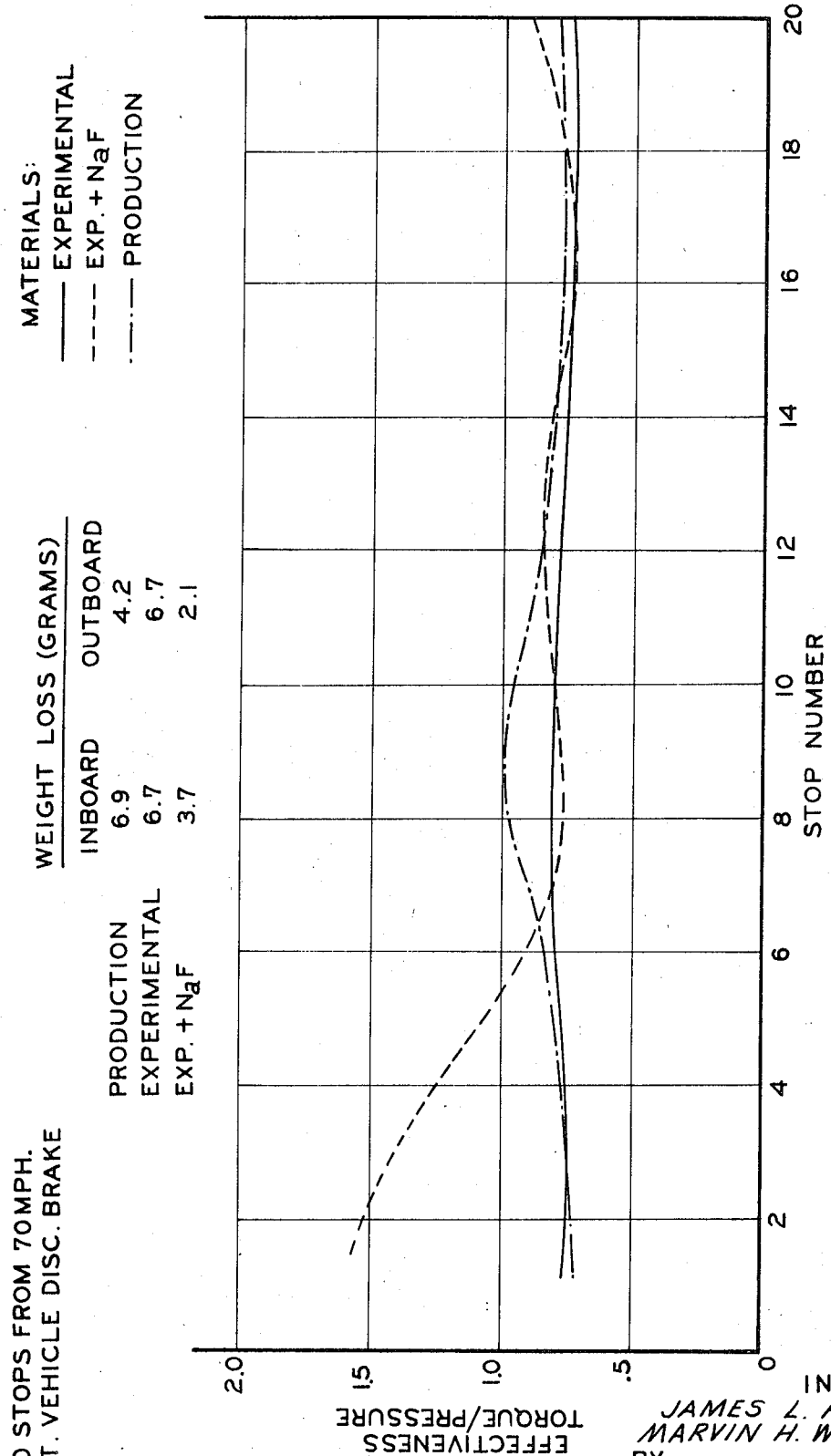

FIG. 2 has been presented to demonstrate the favorable effect the addition of 7% sodium fluoride exerts upon the fade characteristics of a brake lining. The table included in this figure also emphasizes the enhanced wear characteristics of sodium fluoride altered brake lining. This figure contains data upon a conventional brake lining, an experimental lining and the same experimental lining plus seven percent sodium fluoride. This last lining consisted of fifty-seven percent asbestos, ten percent ground cashew particles, fifteen percent novolac resin, ten percent barium sulfate, one percent carbon black and seven percent sodium fluoride. The superior cold stopping ability of the sodium fluoride altered lining is apparent from this figure.

It is to be understood that this invention is applicable to other friction applications such as clutch facing.

We claim as our invention:
1. An automotive friction material comprising as its essential ingredients; asbestos, a synthetic thermo-setting resin, and an alkali metal fluoride selected from the group consisting of lithium fluoride, sodium fluoride and potassium fluoride, in an amount to substantially increase the resistance of the brake lining material to wear.
2. The automotive friction material recited in claim 1 in which the alkali metal fluoride is sodium fluoride and the amount of sodium fluoride additions, does not substantially exceed twenty percent.

References Cited
UNITED STATES PATENTS

| | | | |
|---|---|---|---|
| 1,932,912 | 10/1933 | Rosner | 106—36 |
| 2,554,128 | 5/1951 | Spokes | 260—38 |
| 3,227,249 | 1/1966 | Kuzmick et al. | 188—251 |

MORRIS LIEBMAN, Primary Examiner

S. M. PERSON, Assistant Examiner

U.S. Cl. X.R.

106—36; 260—DIG. 39